A. PROKOPETZ.
FASTENER FOR VEHICLE CANOPY TOPS.
APPLICATION FILED OCT. 11, 1915.
1,196,583.
Patented Aug. 29, 1916.
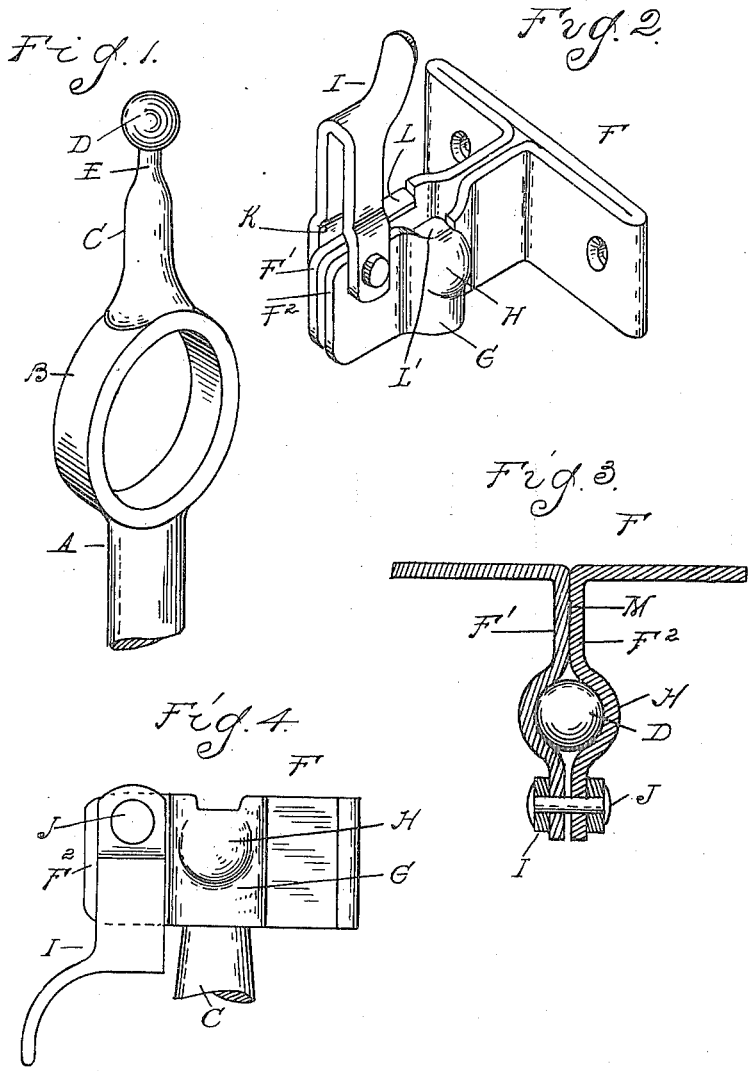
Inventor
August Prokopetz

UNITED STATES PATENT OFFICE.

AUGUST PROKOPETZ, OF DETROIT, MICHIGAN, ASSIGNOR TO VANGUARD MANUFACTURING COMPANY, OF DETROIT, MICHIGAN, A CORPORATION OF MICHIGAN.

FASTENER FOR VEHICLE CANOPY-TOPS.

1,196,583.  Specification of Letters Patent.  Patented Aug. 29, 1916.

Application filed October 11, 1915. Serial No. 55,310.

*To all whom it may concern:*

Be it known that I, AUGUST PROKOPETZ, a citizen of the United States of America, residing at Detroit, in the county of Wayne and State of Michigan, have invented certain new and useful Improvements in Fasteners for Vehicle Canopy-Tops, of which the following is a specification, reference being had therein to the accompanying drawings.

The invention relates to vehicle canopy tops of the class known as "one-man tops", and it is the object of the invention to provide a fastener for quickly attaching the top to and detaching from the windshield.

To this end the invention comprises the construction as hereinafter set forth.

In the drawings: Figures 1 and 2 are perspective views respectively of the coöperating members of the fastener; Fig. 3 is a horizontal section through the socket member slightly modified in construction; and Fig. 4 is a side elevation showing the fastened position of the parts.

A is the bracket for supporting the windshield, having the annular portion B for the pivot bearing and a post or stud C projecting upward therefrom. The upper end of this post is formed with a ball D connected by a neck E of reduced diameter, said ball forming the stationary member of the clip.

F is the coöperating clip member, preferably formed of a metal bar bent into a substantially T-form with a two-ply head and bifurcated stem. The stem portion is fashioned to form a cylindrical socket G for receiving the post C, said socket having an enlarged spherical portion H for engaging the ball D. In normal position the two furcations F' and F², in which the socket is formed, are slightly sprung apart, so that the ball D is free to enter through the cylindrical portion G into the spherical portion H.

I is a clamping lever which as shown is bifurcated to embrace the furcations F' and F², and J is a pivot for attaching the lever to said furcations. The lever I is fashioned to form a cam so that in the position shown in Fig. 2, the furcations F' and F² will be free to spring outward, but in the position shown in Fig. 4 they will be drawn together to contract the socket.

With the construction as described in use, the member F being attached to the canopy top, when the latter is extended the socket G is brought into registration with the post C. The lever I is also in the position shown in Fig. 2, so that the socket is expanded and will slide freely over the ball D until the latter engages the spherical portion H. If the lever I is then turned downward into the position shown in Fig. 4, the cam faces K will draw the furcations F' and F² inward, contracting the socket H, so that the ball D cannot be withdrawn therefrom. This will securely fasten the canopy top against accidental disengagement, but whenever it is desired to release the clamp the raising of the lever I permits the furcations F' and F² to spring apart, after which the socket may be withdrawn.

To facilitate the registration of the ball D with the spherical portion H of the socket lugs L and L' are struck inward from the furcations F' and F² and act as stops to limit the movement of the socket over the post C.

In place of forming the member F of a continuous metal bar bent into T-shaped form it may be formed of two angle bars as shown in Fig. 3, having their parallel flanges forming the furcations F' F² temporarily secured by spot-welding, as indicated at M. This weld will secure the parts in assembled relation until the member F is fastened to the bow of the vehicle canopy. In use, the flexing of the furcations F' and F² may break the welded joint, but on account of the fastening of the flanges to the bow the device still remains operative.

What I claim as my invention is:—

1. A fastener for vehicle canopy top, comprising a post member having a spherical head, a socket member formed of a T-shaped bar having a bifurcated stem with the socket formed in the furcations thereof, said socket having a spherical enlargement for engaging the spherical head of said post, and a bifurcated clamping lever embracing said furcations and cammed to draw the same together to clamp said socket upon said spherical head.

2. A fastener for vehicle canopy top, comprising a headed post member, a coöperating member formed of a T-shaped bar having a bifurcated stem and a socket formed in the furcations of said stem with an enlargement for engaging the head of said post, said bar being resilient to hold said furcations normally spread apart, and clamping means engaging the furcations of said bar to draw the same together.

3. A fastener for a vehicle canopy top, comprising a headed post, two members for clamping said post normally spaced to allow insertion of the post between said members, and a bifurcated clamping lever embracing said members, and cammed to clamp the same upon the post.

4. A fastener for a vehicle canopy top, comprising a headed post, a bifurcated socket member for engaging said post, and a bifurcated clamping lever embracing said furcations and cammed to draw the same together to clamp said socket upon said spherical head.

5. A fastener for a vehicle canopy top, comprising a headed post, a bifurcated socket member, the furcations thereof being resilient and having an enlargement for registration with the head of the post and having an entrance portion at one side of said enlargement normally expanded to receive said head, lugs oppositely projecting from said furcations at the other side of said enlargement forming stops limiting displacement of said head within the socket member, and clamping means engaging said furcations for contracting the same about said head in opposition to their resiliency.

In testimony whereof I affix my signature in presence of two witnesses.

AUGUST PROKOPETZ.

Witnesses:
JAMES P. BARRY,
ADELAIDE F. ADAMS.

Copies of this patent may be obtained for five cents each, by addressing the "Commissioner of Patents, Washington, D. C."